(12) United States Patent
Kumon

(10) Patent No.: US 7,047,737 B2
(45) Date of Patent: May 23, 2006

(54) OIL-HYDRAULIC VEHICLE

(75) Inventor: Shigetomi Kumon, Ehime (JP)

(73) Assignee: Asahi Corporation, Ehime (JP)

( * ) Notice: Subject to any disclaimer, the term of this patent is extended or adjusted under 35 U.S.C. 154(b) by 179 days.

(21) Appl. No.: 10/415,438

(22) PCT Filed: Jan. 17, 2001

(86) PCT No.: PCT/JP01/00279

§ 371 (c)(1),
(2), (4) Date: Oct. 9, 2003

(87) PCT Pub. No.: WO02/40899

PCT Pub. Date: May 23, 2002

(65) Prior Publication Data

US 2004/0050624 A1 Mar. 18, 2004

(30) Foreign Application Priority Data

Nov. 14, 2000 (JP) ........................... 2000-346662

(51) Int. Cl.
*F16D 39/00* (2006.01)

(52) U.S. Cl. ........................................ 60/493
(58) Field of Classification Search ............... 60/493; 137/625.22, 625.23
See application file for complete search history.

(56) References Cited

U.S. PATENT DOCUMENTS

| 433,184 | A | * | 7/1890 | Pickles ............ 60/493 |
| 2,184,219 | A | * | 12/1939 | Johnson ........... 60/493 |
| 2,379,938 | A | * | 7/1945 | Swanson .......... 60/468 |

FOREIGN PATENT DOCUMENTS

| JP | S11-12521 A1 | 9/1936 |
| JP | S13-7363 A1 | 7/1940 |
| JP | S18-11415 A1 | 10/1943 |
| JP | S46-250 A1 | 1/1971 |
| JP | 48-25242 Y | 7/1973 |
| JP | S56-7147 A1 | 6/1979 |
| JP | 54-69677 A1 | 6/1979 |
| JP | 05-346101 A1 | 12/1993 |
| JP | 2000-095134 A1 | 4/2000 |

OTHER PUBLICATIONS

JPO Office Action mailed on Feb. 25, 2003.
International Search Report for PCT/JP01/00279 mailed Apr. 17, 2001.
PCT/IPEA/408 Determination if International Perliminary Examination is Required mailed on Jun. 11, 2002.
PCT/IPEA/409 International Preliminary Examination Report completed on Nov. 1, 2002.

* cited by examiner

*Primary Examiner*—Edward K. Look
*Assistant Examiner*—Devin Hanan
(74) *Attorney, Agent, or Firm*—Rader, Fishman & Grauer PLLC

(57) ABSTRACT

An oil-hydraulic vehicle comprising (i) at least one oil-hydraulic pump 10 driven by an engine E, an input shaft of said oil-hydraulic pump being directly coupled with a crank-shaft C of the engine, (ii) at least one oil-hydraulic motor 30 to drive at least one wheel 31 in both forward and backward directions, (iii) an oil-hydraulic circuit 50 to connect said oil-hydraulic pump 10 and said oil-hydraulic motor 30, and (iv) at least one flow control valve 60 provided between said at least one oil-hydraulic pump 10 and said at least one oil-hydraulic motor 30. Said at least one flow control valve 60 has (i) a first changeover position where the valve 60 returns the oil, which is fed from said oil-hydraulic pump 10 to the valve 60, to said oil-hydraulic pump 10, (ii) a second changeover position where the valve 60 feeds the oil, which is fed from said oil-hydraulic pump 10 to the valve 60, to an inlet of said oil-hydraulic motor 30, and (iii) a third changeover position where the valve 60 feeds the oil, which is fed from said oil-hydraulic pump 10 to the valve 60, to an outlet of said oil-hydraulic motor 30.

2 Claims, 5 Drawing Sheets

OIL-HYDRAULIC VEHICLE

TECHNICAL FIELD

This invention relates to an oil-hydraulic vehicle. More specifically, this invention relates to a transmission mechanism for oil-hydraulic vehicles.

The present invention is applicable to various types of vehicles such as cars, trucks, agricultural machines including farm tractors, and construction machines including bulldozers.

BACKGROUND ART

Oil-hydraulic vehicles have long been available. Those currently in use comprise an engine, a transmission, an oil-hydraulic pump, and oil-hydraulic motors. They transform engine power into wheel-driving power as follows.

First, the turning force of an engine is transformed by a transmission. Second, the transformed turning force is transformed into oil-hydraulic force by an oil-hydraulic pump. Then, the oil-hydraulic force is transformed into turning force by oil-hydraulic motors to drive wheels.

In this way, the turning force of an engine is transformed into wheel-driving force.

Because the transmission of an oil-hydraulic vehicle currently in use consists of a plurality of shafts and many gears, its structure is complex and it is heavy, making the whole vehicle heavy.

Besides, to change gears, it is necessary to let out the clutch between the engine and the transmission. Thus, the drive line from the engine to the oil-hydraulic pump is complex.

DISCLOSURE OF INVENTION

According to the first feature of the present invention, there is provided an oil-hydraulic vehicle comprising (i) at least one oil-hydraulic pump driven by an engine, (ii) at least one oil-hydraulic motor to drive at least one wheel in both forward and backward directions, (iii) an oil-hydraulic circuit to connect said oil-hydraulic pump and said oil-hydraulic motor, and (iv) at least one flow control valve provided between said at least one oil-hydraulic pump and said at least one oil-hydraulic motor. Said flow control valve has (i) a first changeover position where the valve returns the oil, which is fed from said oil-hydraulic pump to the valve, to said oil-hydraulic pump, (ii) a second changeover position where the valve feeds the oil, which is fed from said oil-hydraulic pump to the valve, to an inlet of said oil-hydraulic motor, and (iii) a third changeover position where the valve feeds the oil, which is fed from said oil-hydraulic pump to the valve, to an outlet of said oil-hydraulic motor. Said flow control valve includes (ii) a housing with a cylindrical space and (ii) a rotor fitted in the cylindrical space for free rotation about the center axis of the cylindrical space. The housing of said flow control valve has (i) an oil-feed inlet connected to a discharge opening of said oil-hydraulic pump, (ii) an oil-return outlet connected to a suction opening of said oil-hydraulic pump, (iii) a forward-drive outlet to be connected to the inlet of said oil-hydraulic motor, and (iv) a backward-drive outlet to be connected to the outlet of said oil-hydraulic motor. The oil-return outlet is disposed between the forward- and backward-drive outlets. The rotor of said flow control valve has (i) a sliding surface for free slide on a circumferential wall of the cylindrical space of the housing, (ii) an oil-feed outlet formed in the sliding surface of the rotor, and (iii) an oil-feed channel formed through the rotor to connect the oil-feed inlet of the housing to the oil-feed outlet of the rotor. The oil-feed outlet of the rotor of said flow control valve (i) aligns with the oil-return outlet of the housing when the rotor is switched to the first changeover position, (ii) moves, overlapping partially with both the oil-return and forward-drive outlets, while the rotor is turned from the first changeover position to the second changeover position, and (iii) moves, overlapping partially with both the oil-return and backward-drive outlets, while the rotor is turned from the first changeover position to the third changeover position.

According to the second feature of the present invention, there is provided the oil-hydraulic vehicle of the first feature, wherein said at least one flow control valve includes (ii) a forward-drive connection to connect the backward-drive outlet and the oil-return outlet when the valve is switched from the first changeover position to the second changeover position and (ii) a backward-drive connection to connect the forward-drive outlet and the oil-return outlet when the valve is switched from the first changeover position to the third changeover position.

BRIEF DESCRIPTION OF DRAWINGS

The features and advantages of the present invention will become more clearly appreciated from the following description in conjunction with the accompanying drawings, in which.

BEST MODE FOR CARRYING OUT THE INVENTION

Referring to the drawings, a preferred embodiment of oil-hydraulic vehicle of the present invention will now be described.

Figure 3:
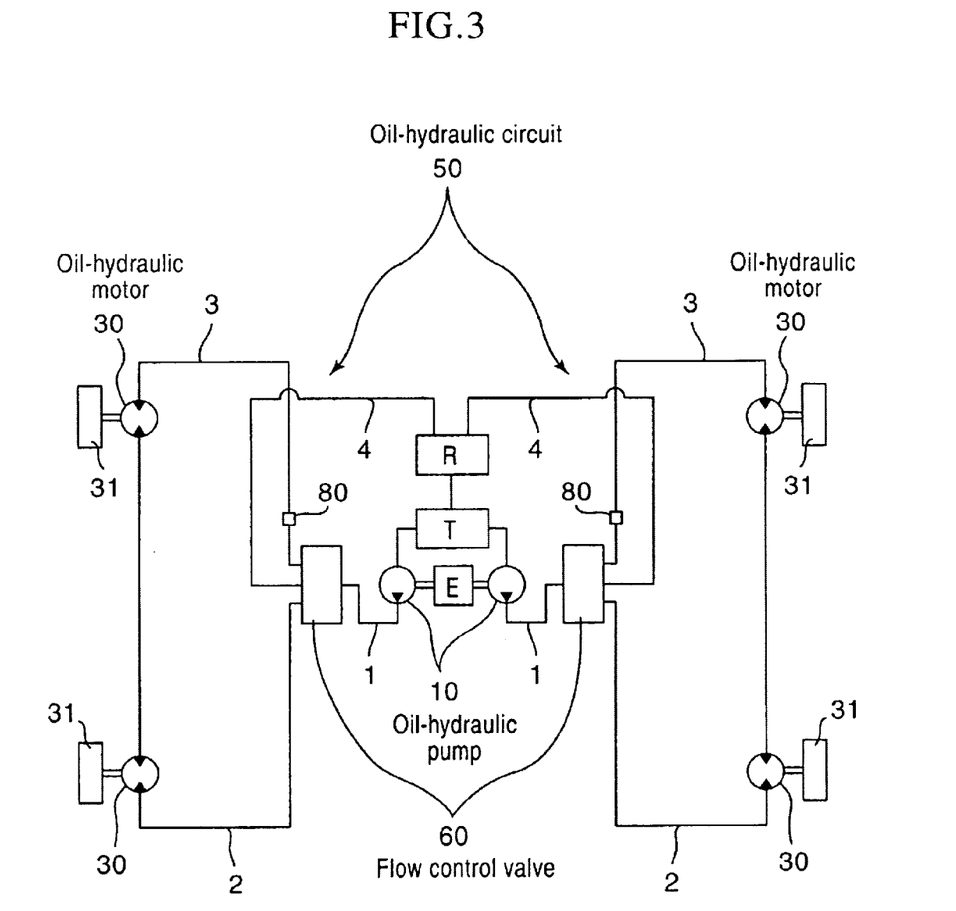
FIG. 3 is a diagram of an oil-hydraulic circuit of an oil-hydraulic vehicle according to the present invention.

FIG. 3 is a diagram of the oil-hydraulic circuit of the oil-hydraulic vehicle. As shown in the figure, the oil-hydraulic vehicle comprises two oil-hydraulic pumps 10, four oil-hydraulic motors 30, and an oil-hydraulic circuit 50 connecting the pumps 10 and the motors 30. A flow control valve 60 is provided between the oil-hydraulic pump 10 and the oil-hydraulic motors 30 on each of the right and left sides of the oil-hydraulic vehicle to change the driving power of the oil-hydraulic motors 30, which is the main feature of the present invention.

The present invention is applicable to various types of vehicles such as cars, trucks, agricultural machines including farm tractors, and construction machines including bulldozers.

Before the detailed description of the flow control valves 60, the oil-hydraulic circuit 50 will be described.

In FIG. 3, reference letters "R," "T," and "E" indicate an oil cooler, an oil tank, and an engine, respectively. Connected to the oil cooler R are right and left return pipes 4.

The oil-hydraulic pump 10 is a well-known gear pump. The input shaft of each oil-hydraulic pump 10 is directly coupled with the crankshaft C of the engine E.

The oil-hydraulic motor 30 is a motor which rotates in both forward and backward directions to drive a wheel. A wheel 31 is secured on the output shaft of each oil-hydraulic motor 30.

As mentioned above, a flow control valve 60 is provided between the oil-hydraulic pump 10 and the oil-hydraulic motors 30 on each of the right and left sides of the oil-hydraulic vehicle. Each flow control valve 60 has a first changeover position where it returns the oil, which is fed from the corresponding oil-hydraulic pump 10 to it, to the suction openings of the oil-hydraulic pumps 10 through the corresponding return pipe 4, a second changeover position where it feeds the oil, which is fed from said oil-hydraulic pump 10 it, to an inlet of each of the corresponding oil-hydraulic motors 30 through a feed pipe 2, and a third changeover position where it feeds the oil, which is fed from said oil-hydraulic pump 10 to it, to an outlet of each of said oil-hydraulic motors 30 through a return pipe 3.

Each flow control valve 60 has a backward-drive connection 75 and a forward-drive connection 76. When said valve 60 is switched to its second changeover position, the forward-drive connection 76 connects the corresponding return pipe 3 to the corresponding return pipe 4, thus connecting the outlets of the corresponding oil-hydraulic motors 30 to the suction openings of the oil-hydraulic pump 10. When said valve 60 is switched to its third changeover position, the backward-drive connection 75 connects the corresponding feed pipe 2 to the corresponding return pipe 4, thus connecting the inlets of the corresponding oil-hydraulic motors 30 to the suction openings of the oil-hydraulic pump 10.

Accordingly, the engine E drives the oil-hydraulic pumps 10, which feed the oil to the flow control valves 60. When the flow control valves 60 are switched to their second changeover positions, the oil-hydraulic motors 30 are driven in the forward direction. When the flow control valves 60 are switched to their first changeover positions, the oil-hydraulic motors 30 stop. When the flow control valves 60 are switched to their third changeover positions, the oil-hydraulic motors 30 are driven in the backward direction. Thus, the flow control valves 60 serve as a transmission by controlling the oil flows to the oil-hydraulic motors 30 and thereby controlling their wheel-driving power. Accordingly, the oil-hydraulic vehicle without a transmission is driven forward and backward and stopped by operating the flow control valves 60.

Besides, the oil fed from the oil-hydraulic pumps 10 to the inlets of the oil-hydraulic motors 30 is discharged from the outlets of the motors 30 and returned to the suction openings of the pumps 10 through the forward-drive connections 76 of the flow control valves 60. The oil fed from the oil-hydraulic pumps 10 to the outlets of the oil-hydraulic motors 30 is discharged from the inlets of the motors 30 and returned to the suction openings of the pumps 10 through the backward-drive connections 75 of the flow control valves 60. Thus, just by providing the flow control valves 60 between the oil-hydraulic pumps 10 and the oil-hydraulic motors 30, the oil discharged from the pumps 30 is returned to them without fail while the motors 30 are driven forward and backward, which renders the oil-hydraulic circuit 50 simple.

Although the oil-hydraulic circuit 50 of the above embodiment consists of a right section with an oil-hydraulic pump 10 for driving the right wheels 31 and a left section with another oil-hydraulic pump 10 for driving the left wheels 31, the two sections may be merged into a single section with a single oil-hydraulic pump 10. Besides, although the oil-hydraulic vehicle of the above embodiment is of four-wheel drive, it may be of front- or rear-wheel drive.

Now, the main feature of the present invention, the flow control valve 60, will be described.

Figure 1:
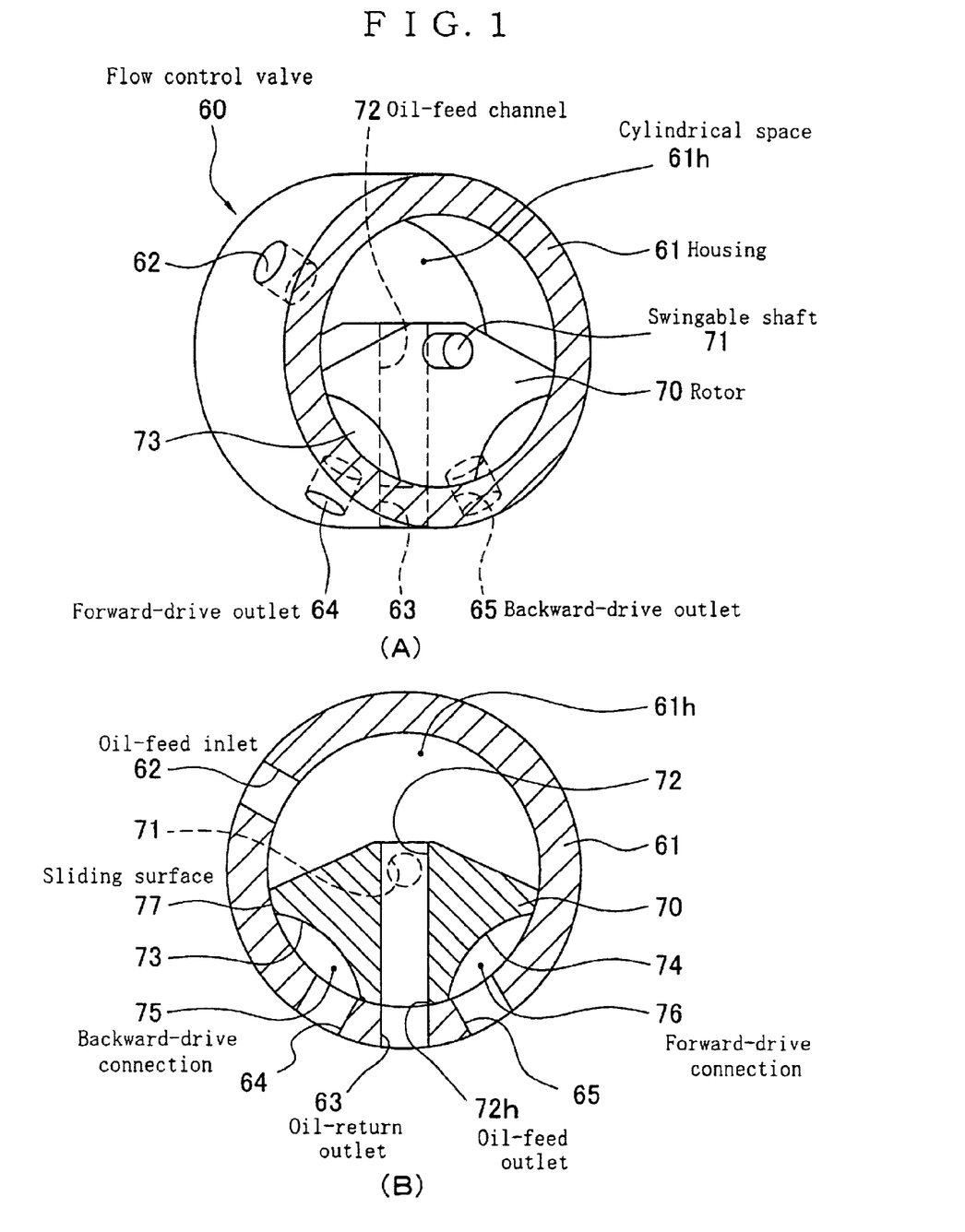
FIG. 1(A) is a sectional perspective schematic illustration of a flow control valve of an oil-hydraulic vehicle according to the present invention.
FIG. 1(B), a longitudinal sectional schematic illustration.

FIG. 1(A) is a sectional perspective schematic illustration of the flow control valve 60; FIG. 1(B), a longitudinal sectional schematic illustration. As shown in the figures, the flow control valve 60 consists basically of a housing 61 and a rotor 70.

The housing 61 is cylindrical and has a cylindrical space 61h inside. Formed in the cylindrical wall of the housing 61 are an oil-feed inlet 62, an oil-return outlet 63, a forward-drive outlet 64, and a backward-drive outlet 65.

The oil-return outlet 63 is disposed between the forward-drive outlet 64 and the backward-drive outlet 65, and the radial angle with the center axis of the cylindrical space 61h between the oil-return outlet 63 and the forward-drive outlet 64 is equal to that between the oil-return outlet 63 and the backward-drive outlet 65.

The oil-feed inlet 62 of each flow control valve 60 is connected to the discharge opening of the corresponding oil-hydraulic pump 10 through a feed pipe 1. The oil-return outlet 63 of said valve 60 is connected to the suction openings of the oil-hydraulic pumps 10 through the corresponding return pipe 4. The forward-drive outlet 64 of said valve 60 is connected to the inlets of the corresponding oil-hydraulic motors 30 through the corresponding feed pipe 2. The backward-drive outlet 65 of said valve 60 is connected to the outlets of the corresponding oil-hydraulic motors 30 through the corresponding return pipe 3.

The rotor 70 is fitted in the cylindrical space 61h of the housing 61. The rotor 70 is fixed onto a swingable shaft 71 which is journaled in the housing 61. The rotor 70 is a sector member. The circular-arc surface and both sides of the rotor 70 are put in oil-tight contact with, and for free slide on, the circumferential wall and side walls of the cylindrical space 61h. The circular-arc surface of the rotor 70 is a sliding surface 77. Thus, the sliding surface 77 slides on the circumferential wall of the cylindrical space 61h.

Formed in the sliding surface 77 of the rotor 70 is an oil-feed outlet 72h, which is connected to the oil-feed inlet 62 of the housing 61 by an oil-feed channel 72 formed through the rotor 70.

Accordingly, when the rotor 70 is turned, the sliding surface 77 moves along the circumferential wall of the cylindrical space 61h and the oil-feed outlet 72h of the rotor 70 overlaps the outlets 63, 64, and 65 of the housing 61. When the rotor 70 is turned to the first changeover position, the oil-feed outlet 72h overlaps the oil-return outlet 63. When the rotor 70 is turned to the second changeover position, the oil-feed outlet 72h overlaps the forward-drive outlet 64. When the rotor 70 is turned to the third changeover position, the oil-feed outlet 72h overlaps the backward-drive outlet 65.

Besides, the oil-return outlet 63 is formed between the forward-drive outlet 64 and the backward-drive outlet 65; accordingly, the oil-feed outlet 72h moves, overlapping partially with both the oil-return and forward-drive outlets 63 and 64, while the rotor 70 is turned from the first changeover position to the second one.

Likewise, the oil-feed outlet 72h moves, overlapping partially with both the oil-return and backward-drive outlets 63 and 65, while the rotor 70 is turned from the first changeover position to the third one.

Thus, with the flow control valve 60 of the above configuration, the active oil channel is switched (i) between the oil-return and forward-drive outlets 63 and 64 just by turning the rotor 70 between the first and second changeover positions and (ii) between the oil-return and backward-drive outlets 63 and 65 just by turning the rotor 70 between the first and third changeover positions.

In addition, because the overlapping areas between the oil-feed outlet 72h and the oil-return and forward-drive outlets 63, 64 and the overlapping areas between the oil-feed outlet 72h and the oil-return and backward-drive outlets 63, 65 are changed by turning the rotor 70, the flow rates from the oil feed inlet 62 to the outlets 63, 64, 65 through the oil-feed channel 72 and the oil-feed outlet 72h are continuously variable. Thus, by turning the rotor 70, the wheel-driving power of the oil-hydraulic motors 30 is continuously variable.

Moreover, because the flow control valve 60 consists basically of the housing 61 and the rotor 70 alone and the wheel-driving power is changed just by turning the rotor 70, the transmission mechanism of the oil-hydraulic vehicle is simple.

Furthermore, no clutch is required because it is unnecessary to decouple the input shafts of the oil-hydraulic pumps 10 from the crankshaft of the engine E when the flow control valves 60 are switched. Thus, the oil-hydraulic vehicle dispenses with a transmission and a clutch each consisting of a plurality of shafts and gears; therefore, the oil-hydraulic vehicle is relatively light and the structure of its drive lines from the engine E to the oil-hydraulic pumps 10 is relatively simple.

A backward-drive recessed surface 73 is formed in the sliding surface 77 of the rotor 70 on the forward-drive outlet 64's side of the oil-feed outlet 72h. A forward-drive recessed surface 74 is formed in the sliding surface 77 of the rotor 70 on the backward-drive outlet 65's side of the oil-feed outlet 72h. Each of the backward-drive and forward-drive recessed surfaces 73 and 74 is in the form of a general arc in cross section. The distance between both ends of the general arc in cross section of the backward-drive recessed surface 73 is larger than the distance between the distal point on the edge of the oil-return outlet 63 and the distal point on the edge of the forward-drive outlet 64. The distance between both ends of the general arc in cross section of the forward-drive recessed surface 74 is larger than the distance between the distal point on the edge of the oil-return outlet 63 and the distal point on the edge of the backward-drive outlet 65. The space between the backward-drive recessed surface 73 and the circumferential wall of the cylindrical space 61h is the backward-drive connection 75. The space between the forward-drive recessed surface 74 and the circumferential wall of the cylindrical space 61h is the forward-drive connection 76.

A throttle valve 80 is provided in each return pipe 3. The throttle valve 80 in each return pipe 3 comprises a housing 81 formed in said return pipe 3 and a rotor 82 fitted in the housing 81. When the flow control valves 60 are switched to their third changeover positions, the rotors 82 of the throttle valves 80 turn and protrude into the insides of the return pipes 3 to reduce the sectional areas of the return pipes 3. Accordingly, when the oil-hydraulic vehicle backs, the flow rates in the return pipes 3 are reduced, reducing the speed of the oil-hydraulic vehicle.

Now, the control system of the flow control valve 60 will be described.

Figure 2:
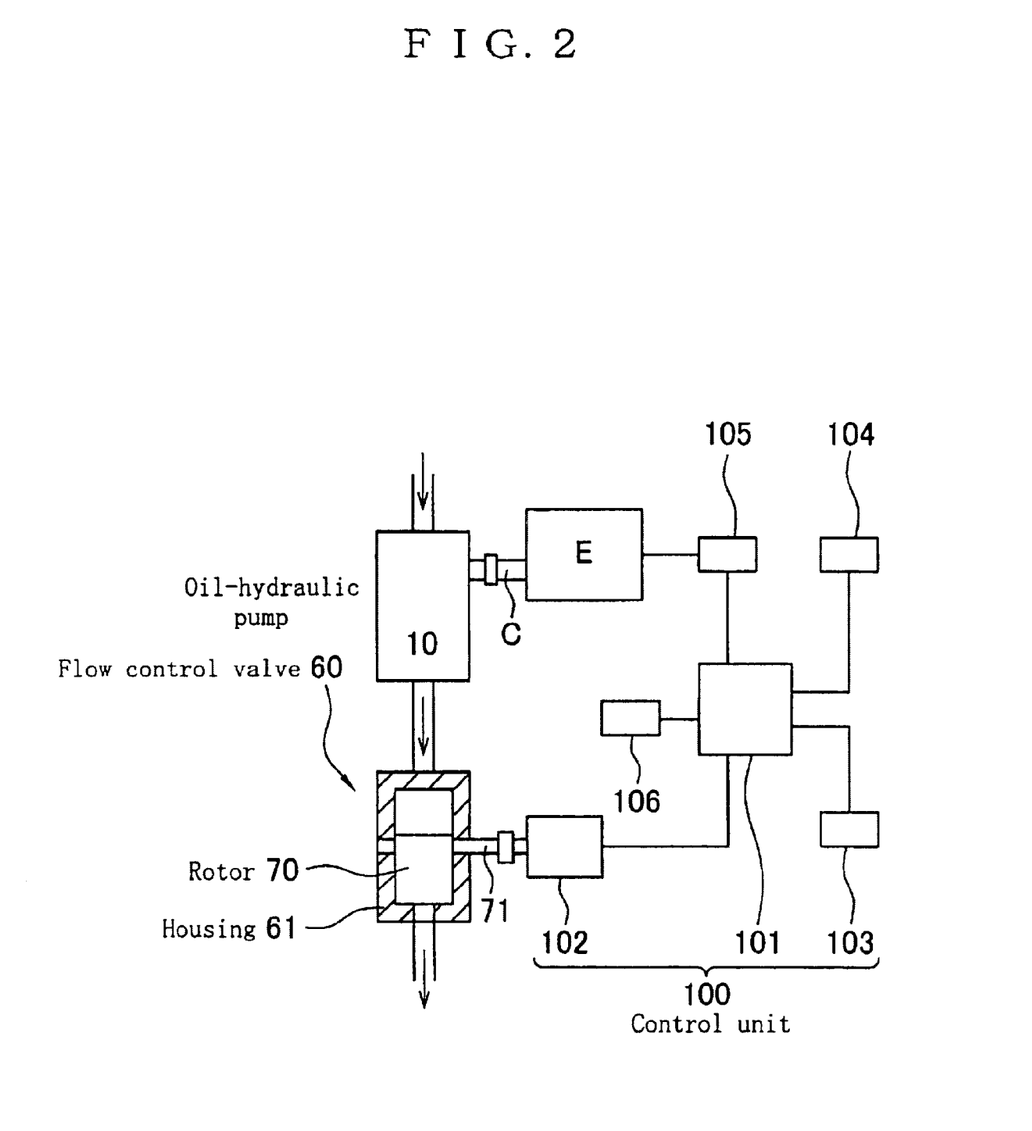
FIG. 2 is a block diagram of a control unit of an oil-hydraulic vehicle according to the present invention.

FIG. 2 is a block diagram of a control unit 100 of the oil-hydraulic vehicle. The reference numeral 102 indicates an actuator to control the turning of the rotor 70 of the flow control valve 60. The actuator 102 is, for example, a well-known motor. The swingable shaft 71 of the rotor 70 is coupled with the shaft of the actuator 102; accordingly, the rotor 70 is turned by the actuator 102. The actuator 102 is not limited to motors, but can be anything capable of turning the rotor 70.

The reference numeral 101 indicates a controller, which controls the turning direction and angle of the rotor 70. Connected to the controller 101 are a brake-pedal sensor 103, an accelerator-pedal sensor 104, a tachometer 105, and a speedometer 106. The controller 101 processes data from those devices 103, 104, 105, and 106 and controls the actuator 102. Also connected to the controller 101 is a switch (not shown) to switch the oil-hydraulic vehicle among stop, forward-drive, and backward-drive modes.

The oil-hydraulic vehicle may be provided with a device to sense the distance to a vehicle running ahead of it with, for example, a laser or a camera so that the sensor device will send a signal to the controller 101 when the distance becomes smaller than a set value and the controller 101 will cause the flow control valve 60 to apply an engine brake. In this case, if a vehicle running ahead makes such a sudden stop as the driver cannot cope with it with the foot brake, the controller 101 will bring the oil-hydraulic vehicle automatically to a stop to secure safety.

The oil-hydraulic vehicle may be provided with a device to sense the distance to an object or a person behind it with, for example, a laser or a camera in the backward-drive mode so that the sensor device will send a signal to the controller 101 when the distance becomes smaller than a set value and the controller 101 will cause the flow control valve 60 to apply an engine brake. In this case, if the driver inadvertently puts the oil-hydraulic vehicle in the backward-drive mode instead of the forward-drive mode and presses the accelerator to panic, the controller 101 will bring the vehicle automatically to a stop to secure safety if there is an object or a person behind the vehicle. Besides, if there is an object or a person put out of the driver's sight, the controller 101 will bring the vehicle automatically to a stop to secure safety.

The rotor 70 may be handled manually. In this case, a lever provided at the steering wheel is linked with the swingable shaft 71 of the rotor 70.

Now, the workings and effect of the oil-hydraulic vehicle will be described.

In FIGS. 1(A) and 1(B), the rotor 70 is at the first changeover position to drive the wheels neither forward nor backward. One end of the oil line on the oil-hydraulic motors 30's side is closed at the forward-drive connection 76; the other end, at the backward-drive connection 75. Thus, the oil-hydraulic motors 30 are effectively locked up, holding the oil-hydraulic vehicle at a standstill.

When the engine E is started to drive the oil-hydraulic pumps 10, the oil in the oil tank T is fed by the pumps 10 to the housings 61 of the flow control valves 60 though the feed pipes 1 and then returned to the oil tank T through the oil-feed channels 72, the oil-return outlets 63, the return pipes 4, and the oil cooler R. Thus, while the rotors 70 are in their first changeover positions, the oil just circulates without driving the wheels 31, leaving the oil-hydraulic vehicle at a standstill.

Figure 4:
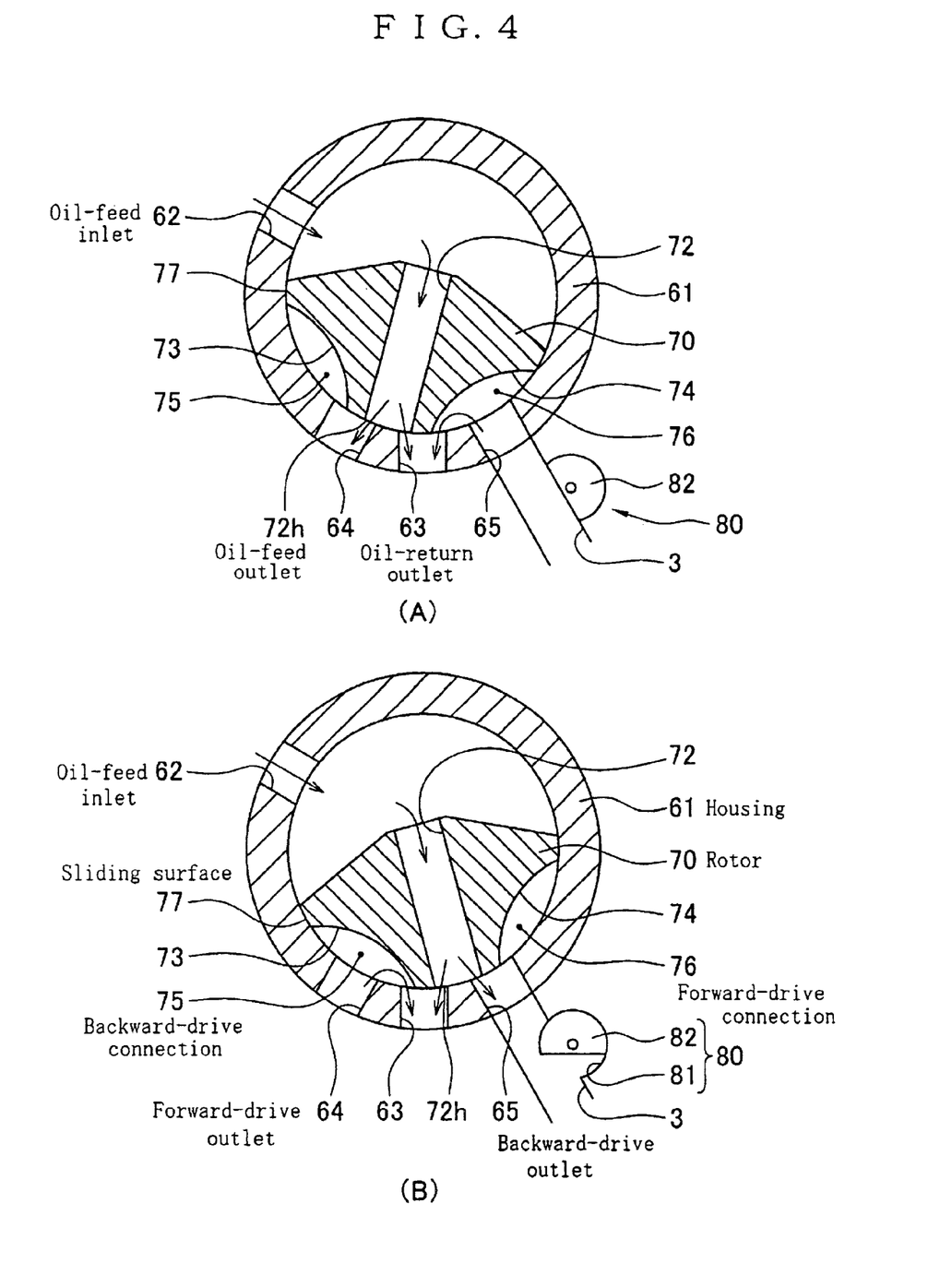
FIGS. 4(A) and 4(B) are illustrations of the workings of the flow control valve of FIG. 1, the former showing the rotor in the second changeover position and the latter showing the same in the third changeover position.

FIGS. 4(A) and 4(B) are illustrations of the workings of the flow control valve 60, the former showing the rotor 70 in the second changeover position and the latter showing the same in the third changeover position. When the driver puts the oil-hydraulic vehicle in its forward-drive mode as shown in FIG. 4(A) and steps on the accelerator, the engine E raises its rotational speed. The controller 101 processes the signals from the tachometer 105 and the accelerator-pedal sensor 104, and the actuator 102 turns the rotor 70 clockwise to switch it from the first changeover position to the second one, the oil-feed outlet 72h partially overlapping both the oil-return outlet 63 and the forward-drive outlet 64. Thus, the oil is fed to the inlets of the oil-hydraulic motors 30 through the feed pipe 2 to drive the oil-hydraulic motors 30 and the wheels 31 in the forward direction.

The oil discharged from the outlets of the oil-hydraulic motors 30 flows through the return pipe 3, the backward-drive outlet 65, the forward-drive connection 76, the oil-return outlet 63, and the return pipe 4. Thus, the oil fed from the oil-hydraulic pump 10 is returned to it without fail.

While the oil-hydraulic vehicle is running forward, the controller 101 processes the signals from the brake-pedal sensor 103, the accelerator-pedal sensor 104, the tachometer 105, and the speedometer 106 and controls the actuator 102 to adjust the oil flow rate to the oil-hydraulic motors 30 and thereby adjust the wheel-driving power continuously; accordingly, the oil-hydraulic vehicle runs smoothly.

When the driver puts the oil-hydraulic vehicle in its backward-drive mode as shown in FIG. 4(B) and steps on the accelerator, the engine E raises its rotational speed. The controller 101 processes the signals from the tachometer 105 and the accelerator-pedal sensor 104, and the actuator 102 turns the rotor 70 counterclockwise to switch it from the first changeover position to the third one, the oil-feed outlet 72h partially overlapping both the oil-return outlet 63 and the backward-drive outlet 65. Thus, the oil is fed to the outlets of oil-hydraulic motors 30 through the return pipe 3 to drive the oil-hydraulic motors 30 and the wheels 31 in the backward direction.

The oil discharged from the inlets of the oil-hydraulic motors 30 flows through the feed pipe 2, the forward-drive outlet 64, the backward-drive connection 75, the oil-return outlet 63, and the return pipe 4. Thus, the oil fed from the oil-hydraulic pump 10 is returned to it without fail.

Besides, with the rotor 82 of the throttle valve 80 protruding into the inside of the return pipe 3, the flow rate in the pipe 3 is reduced. Thus, if the degree of pressing the accelerator and the rotational speed of the engine E during a backward run are the same as those during a forward run, the backward-run speed of the oil-hydraulic vehicle is smaller than its forward-run speed, thus securing the safety during backward runs.

Figure 5:
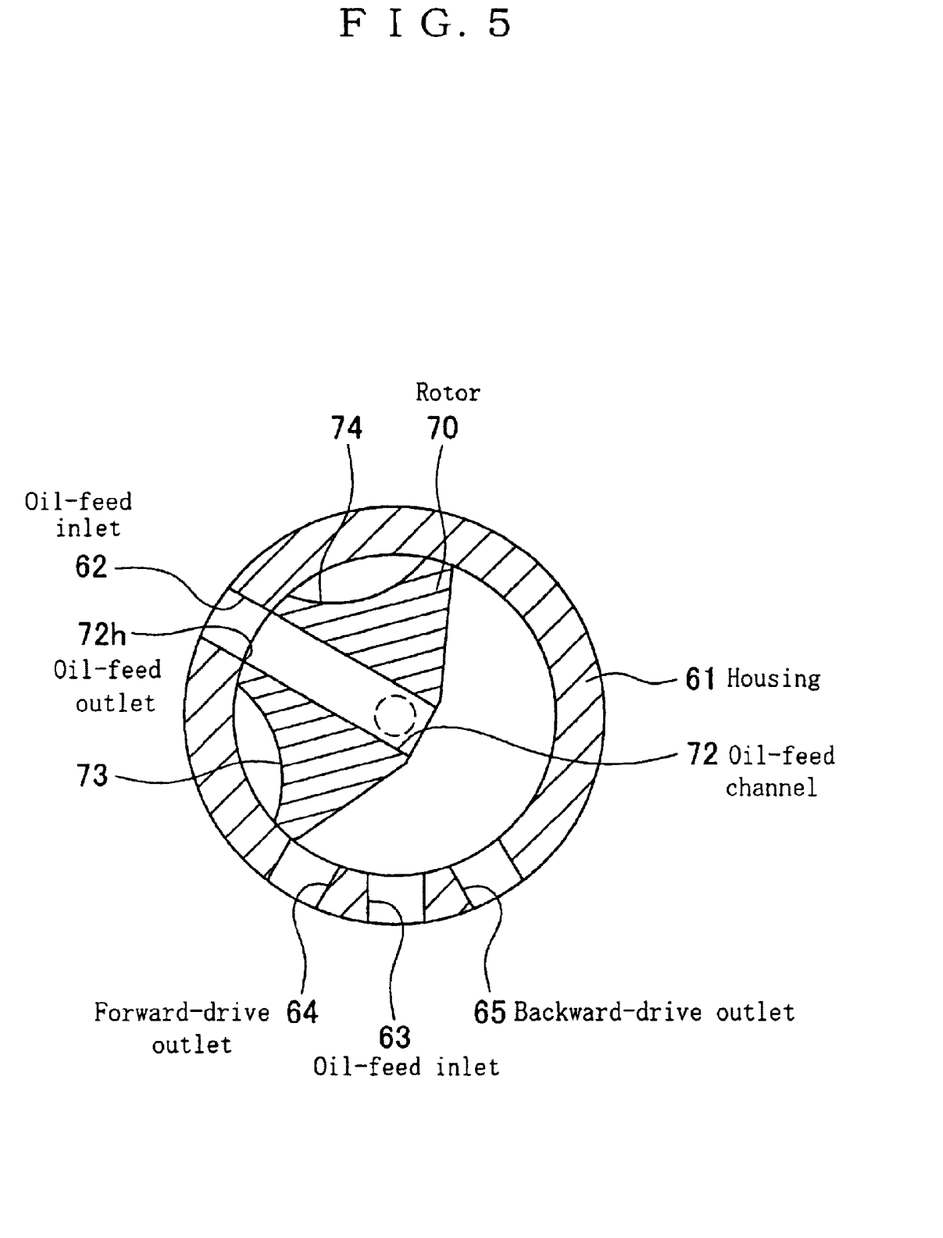
FIG. 5 is an illustration of the workings of the flow control valve of FIG. 1, showing the position of the rotor for free rotation of wheels.

FIG. 5 is an illustration of the workings of the flow control valve 60, showing the position of the rotor 70 for free rotation of the wheels 31. If the engine E stops due to trouble, etc. and the rotor 70 is manually turned to align the oil-feed outlet 72h with the oil-feed inlet 62, a closed circuit is formed through the feed pipe 2, the oil-hydraulic motors 30, and the return pipe 3 to allow the free rotation of the wheels 31 while the oil-hydraulic vehicle is towed.

The invention may be embodied in other specific forms without departing from the spirit or essential characteristics thereof. The above embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

INDUSTRIAL APPLICABILITY

According to the first feature of the invention, because the flow control valve between the oil-hydraulic pump and the oil-hydraulic motor is switched among its first, second, and third changeover positions just by turning the rotor of the flow control valve, the oil-hydraulic motor is turned forward and backward and stopped just by turning the rotor. Thus, the oil-hydraulic vehicle is run forward and backward and stopped by operating the flow control valve, without providing the vehicle with a transmission to control the rotation of the oil-hydraulic pump. Besides, the flow control valve comprises a housing and a rotor alone and the driving power is changed just by turning the rotor; therefore, the transmission mechanism of the oil-hydraulic vehicle is simple in structure. Moreover, when the rotor of the flow control valve is moved from the first changeover position to the second changeover position, the oil-feed outlet of the rotor moves, overlapping both the oil-return and forward-drive outlets; and when the rotor is moved from the first changeover position to the third changeover position, the oil-feed outlet of the rotor moves, overlapping both the oil-return and backward-drive outlets. In other words, by changing the rotational position of the rotor, the overlapping areas between the oil-feed outlet on the rotor's side and the oil-return and forward- or backward-drive outlets on the housing's side are continuously changed. Therefore, the flow rate of oil from the oil-feed inlet of the housing to the forward- or backward-drive outlet through the oil-feed channel of the rotor is continuously changed. Thus, by turning the rotor of the flow control valve, the flow rate of oil fed to the oil-hydraulic pump and hence the wheel-driving power are continuously variable.

According to the second feature of the invention, the oil fed to the inlet of the oil-hydraulic motor is discharged from its outlet and returned to the suction opening of the oil-hydraulic pump through the forward-drive connection while the rotor of the flow control valve is in its second changeover position; and the oil fed to the outlet of the oil-hydraulic motor is discharged from its inlet and returned to the suction opening of the oil-hydraulic pump through the backward-drive connection while the rotor of the flow control valve is in its third changeover position. Thus, just by providing the flow control valve between the oil-hydraulic pumps and the oil-hydraulic motor, the oil fed from the oil-hydraulic pump to the oil-hydraulic motor is returned to the pump without fail, which makes the oil-hydraulic circuit of the oil-hydraulic vehicle simple.

What is claimed is:

1. An oil-hydraulic vehicle comprising:

at least one oil-hydraulic pump driven by an engine;

at least one oil-hydraulic motor to drive at least one wheel in both forward and backward directions;

an oil-hydraulic circuit to connect said oil-hydraulic pump and said oil-hydraulic motor; and at least one flow control valve provided between said at least one oil-hydraulic pump and said at least one oil-hydraulic motor, said flow control valve having:

a first changeover position where the valve returns the oil, which is fed from said oil-hydraulic pump to the valve, to said oil-hydraulic pump;

a second changeover position where the valve feeds the oil, which is fed from said oil-hydraulic pump to the valve, to an inlet of said oil-hydraulic motor; and a third changeover position where the valve feeds the oil, which is fed from said oil-hydraulic pump to the valve, to an outlet of said oil-hydraulic motor, said flow control valve further including:

a housing with a cylindrical space; and a rotor fitted in the cylindrical space for free rotation about the center axis of the cylindrical space, the housing of said flow control valve having:

an oil-feed inlet connected to a discharge opening of said oil-hydraulic pump;

an oil-return outlet connected to a suction opening of said oil-hydraulic pump via an oil cooler and an oil tank;

a forward-drive outlet to be connected to the inlet of said oil-hydraulic motor; and a backward-drive outlet to be connected to the outlet of said oil-hydraulic motor, the oil-return outlet being disposed between the forward- and backward-drive outlets, the rotor of said flow control valve having:

a sliding surface for free slide on a circumferential wall of the cylindrical space of the housing;

an oil-feed outlet formed in the sliding surface of the rotor; and an oil-feed channel formed through the rotor to connect the oil-feed inlet of the housing to the oil-feed outlet of the rotor, the oil-feed outlet of the rotor of said flow control valve:

aligning with the oil-return outlet of the housing when the rotor is switched to the first changeover position;

moving, overlapping partially with both the oil-return and forward-drive outlets, while the rotor is turned from the first changeover position to the second changeover position; and moving, overlapping partially with both the oil-return and backward-drive outlets, while the rotor is turned from the first changeover position to the third changeover position, wherein, in the first changeover position, the oil-feed channel is in fluid communication with the oil-return outlet and is isolated from fluid communication with the forward-drive outlet and the backward-drive outlet, in the second changeover position, the oil-feed channel is in fluid communication with both the forward-drive outlet and the oil-return outlet and the oil-return outlet is in fluid communication with the backward-drive outlet and, in the third changeover position, the oil-feed channel is in fluid communication with both the backward-drive outlet and the oil-return outlet and the oil-return outlet is in fluid communication with the forward-drive outlet.

2. The oil-hydraulic vehicle according to claim 1, wherein said at least one flow control valve includes:

a forward-drive connection to connect the backward-drive outlet and the oil-return outlet when the valve is switched from the first changeover position to the second changeover position; and a backward-drive connection to connect the forward-drive outlet and the oil-return outlet when the valve is switched from the first changeover position to the third changeover position.

* * * * *